United States Patent [19]

Bayer

[11] 3,922,469

[45] Nov. 25, 1975

[54] COMPOSITE LAMINATE ADHESIVELY BONDED WITH A HOT MELT COMPOSITION

[75] Inventor: John W. Bayer, Toledo, Ohio

[73] Assignee: Owens-Illinois, Inc., Toledo, Ohio

[22] Filed: Mar. 25, 1974

[21] Appl. No.: 454,241

Related U.S. Application Data

[62] Division of Ser. No. 336,769, Feb. 28, 1973, abandoned, which is a division of Ser. No. 156,693, June 25, 1971, Pat. No. 3,749,630.

[52] U.S. Cl. .............. 428/424; 428/435; 428/474; 260/78 R; 156/331
[51] Int. Cl.² .......................................... B32B 27/40
[58] Field of Search .................. 161/190, 227, 197; 260/78 R; 156/331

[56] References Cited
UNITED STATES PATENTS

| | | | |
|---|---|---|---|
| 2,333,639 | 11/1943 | Christ et al. ........................ | 260/78 R |
| 2,386,454 | 10/1945 | Frosch ................................ | 260/78 R |
| 2,396,248 | 3/1946 | Christ .................................. | 260/78 |
| 2,463,977 | 3/1949 | Kropa ................................ | 260/78 R |
| 2,840,264 | 6/1958 | Groves .............................. | 156/331 X |
| 3,272,776 | 9/1966 | Caldwell .......................... | 260/78 R X |
| 3,372,826 | 3/1968 | Heaton............................... | 215/12 R |
| 3,499,853 | 3/1970 | Griebsch et al................. | 156/331 X |
| 3,749,630 | 7/1973 | Bayer.................................. | 156/293 |

Primary Examiner—William J. Van Balen
Assistant Examiner—Patricia C. Ives
Attorney, Agent, or Firm—Robert F. Rywalski; Edward J. Holler

[57] ABSTRACT

Thermoplastic adhesive polycarbonamide-ester compositions having molecular weights ranging from about 2000 to 7000, a viscosity of about 2000 to 5000 centipoise at 160°C. and a tensile shear strength of about 75 to 140 pounds per 1 × ½ inch lap, which are useful in the formation of creep resistant adhesive bonds in product assembly between laminae of relatively impervious materials such as glass, metals and certain of the plastics, e.g. polyethylene. An outstanding product assembly of this invention is a container of composite construction having a glass envelope of thin walled construction in the shape of an inverted light bulb bonded to a plastic cup-like base member with the above-described thermoplastic adhesive composition.

2 Claims, 2 Drawing Figures

U.S. Patent    Nov. 25, 1975    3,922,469
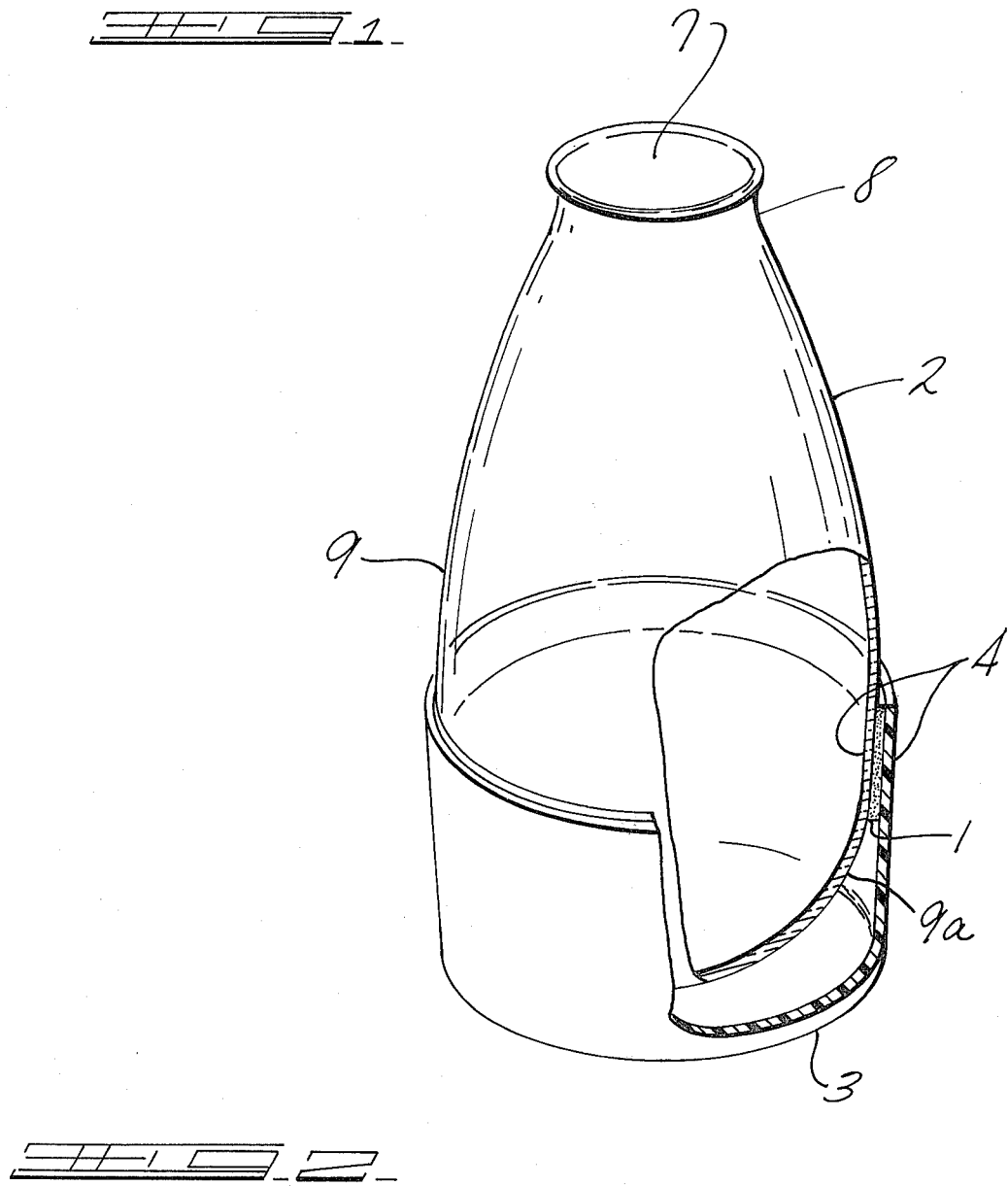

COMPOSITE LAMINATE ADHESIVELY BONDED WITH A HOT MELT COMPOSITION

This is a Division, of application Ser. No. 336,769, filed Feb. 28, 1973 now abandoned which application was a Division of application Ser. No. 156,693 filed June 25, 1971, now U.S. Pat. No. 3,749,630.

BACKGROUND OF THE INVENTION

This invention relates to polycarbonamide-ester compositions, methods of forming creep resistant bonds between impervious materials and containers of composite construction. More particularly, this invention relates to containers of composite construction formed from a glass envelope of thin wall construction adhesively bonded with a hot melt adhesive, that is the product of the condensation of a dicarboxylic acid and an alkanolamine or a mixture of alkanolamine and diamine, to a plastic (preferably polyethylene) cup-like base designed for engaging the bottom or major portion of the glass envelope.

Ever since the introduction of the first commercial ethylene vinylacetate copolymers in the early 1960's, there has been an ever increasing demand for thermoplastic resins as adhesives by the packaging, and more recently by the product assembly industries. Of the several unique benefits hot melts have to offer over conventional bonding methods — gap filling, speed, ability to bond impervious surfaces, reduced machinery cleanup time — speed is the one characteristic most often emphasized, since this property alone can often make the difference between a successful and unsuccessful packaging line.

With the increasing shift in application of thermoplastic adhesives from the packaging to the product assembly industries, has come a shift in the emphasis with respect to the critical properties of thermoplastic adhesives. The tolerances for product assembly hot-melts are very much more critical than those for adhesives used in packaging where rather wide variations in application techniques, temperature, and other processing conditions can usually be tolerated without a great deal of difficulty.

The greater demands placed on thermoplastic adhesives by the product assembly industry has resulted in the development of a whole new class of so-called "high performance adhesives" based on polyesters, hydroxyvinyl resins, and polyamide polymers and copolymers. These more recently developed high performance thermoplastic adhesives, in addition to a number of the properties previously listed for conventional thermoplastic packaging adhesives, generally have increased tensile strength, greater flexibility, greater degree of wettability on a larger number of substrates, increased creep resistance, increased resistance to environmental conditions and sharper melting points.

Separate articles by J. R. Harrison and J. C. Hunt appearing in the October 1969 and August 1970 issues of "Adhesive Age" respectively, provide a relatively complete summary of the problems encountered in the use and selection of product assembly hot-melts and some of the advantages and limitations of specific adhesives currently in commercial use.

My invention is the discovery of certain relatively low molecular weight polycarbonamide-ester compositions which form highly creep resistant adhesive bonds between laminae generally acknowledged to be impervious to such materials. The strength of the adhesive bond is believed to be a function of the crystallinity of the adhesives which gradually increases with the aging of the adhesive. This unusually high degree of creep resistance of the adhesive when cured, coupled with the highly favorable flow characteristics of the polymer compositions at temperatures in the range of from about 125° to 175°C. make my adhesives very highly favorable as a product assembly hot melt.

SUMMARY OF THE INVENTION

My invention is a creep resistant thermoplastic adhesive composition, having a tensile shear strength of about 75 to 140 pounds per 1 × ½ inch lap, an average molecular weight of about 2000 to 7000 and a viscosity of about 2000 to 5000 cps at 160°C., which is the product of the condensation of a stoichiometric amount of a saturated aliphatic dicarboxylic acid having a hydrocarbon chain length of 4 to 12 carbon atoms, with a stoichiometric amount of a saturated alkanolamine having a hydrocarbon chain length of 2 to 6 carbon atoms.

In the preferred embodiment of my invention, the creep resistant thermoplastic adhesive composition is prepared by the condensation of a stoichiometric amount of 7.0 mole percent excess of a saturated aliphatic dicarboxylic acid having a hydrocarbon chain length of 4 to 10 carbon atoms, with a stoichiometric amount of a mixture comprising 70.0 to 99.0 mole percent, based on dicarboxylic acid, of a saturated aliphatic alkanolamine having a hydrocarbon chain length of 2 to 6 carbon atoms and 1.0 to 30.0 mole percent, based on dicarboxylic acid, of a saturated aliphatic diamine having a hydrocarbon chain length of 2 to 6 carbon atoms, or a symmetrical alicyclic diamine having a hydrocarbon ring of 8 carbon atoms.

Additional embodiments of my invention include a method for forming creep resistant adhesive bonds between laminae of relatively impervious materials and the articles of composite construction prepared thereby.

DESCRIPTION OF THE DRAWING

FIG. 1 is a perspective view and partial section of a container of composite construction prepared according to the method of this invention.

FIG. 2 is a cross-sectional view through a laminate also prepared according to the method of this invention.

In FIG. 1, a glass envelope 2 is adhesively bonded along its entire circumference at a common adhesive interface 4 to the upstanding cylindrical wall portion of a cup-like fitment 3 by a thin continuous annular band 1 of thermoplastic adhesive along a common adhesive interface.

In FIG. 2, two juxtaposed laminae 15 and 16 of relatively impervious materials are bonded to one another in sandwich-like fashion by an interlayer of creep resistant thermoplastic adhesive 17 at their respective adhesive interfaces 14.

DESCRIPTION OF THE INVENTION INCLUDING PREFERRED EMBODIMENTS

Thermoplastic Adhesives

1. Monomeric Components — The thermoplastic adhesives of this invention are polycarbonamide-ester copolymers prepared by the condensation polymerization of a dicarboxylic acid with an alkanolamine or with a mixture of an alkanolamine and a diamine.

The dicarboxylic acid monomers which can be used in the preparation of the thermoplastic adhesives of this invention have the following structural formula:

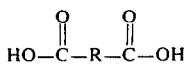

wherein,
R is a saturated aliphatic hydrocarbon radical of 4 to 10 carbon atoms.

Representative of the dicarboxylic acid monomers which can be used in the preparation of the thermoplastic adhesive compositions of this invention are hexanedioic acid (adipic acid), heptane-dioic acid (pimelic acid), octanedioic acid (suberic acid), nonanedioic acid (azelaic acid) and decanedioic acid (sebacic acid).

The preferred dicarboxylic acid monomers of this invention are adipic, azelaic and sebacic acid.

All of the dicarboxylic acid monomers used in the preparation of the polycarbonamide-ester adhesives of this invention are either readily available as reagent grade chemicals or can be prepared by standard laboratory synthesis.

Alkanolamine monomers of the polycarbonamide-ester adhesives of this invention can be represented by the following structural formula,

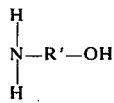

wherein,
R' is a saturated aliphatic hydrocarbon radical of 2 to 6 carbon atoms, including ethyl, propyl, pentyl and hexyl.

Alkanolamines representative of the alkanolamine monomers which can be used in the preparation of the polycarbonamide-ester adhesive compositions of this invention are ethanolamine, 3-amino-1-propanol, and 6-amino-1-hexanol.

The preferred alkanolamine monomers of this invention have hydrocarbon chain lengths in the range of from 2 to 4 carbon atoms, with ethanolamine being the most preferred of this group.

Most, if not all, of the alkanolamine monomers of this invention are readily available as reagent grade chemicals and where not so available can be prepared by simple standard laboratory techniques.

The diamine monomers of the polycarbonamide-ester adhesive compositions of this invention can be represented by the following structural formula,

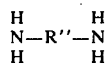

wherein,
R'' is a saturated aliphatic hydrocarbon radical of 2 to 6 carbon atoms or a symmetrical alicyclic hydrocarbon radical of 8 carbon atoms, namely ethylene and hexamethylene.

Typical of the diamine monomers which can be used in the polycarbonamide-ester adhesive compositions of this invention are ethylene diamine and 1,6 hexamethylene diamine, with ethylene diamine being most preferred.

The same holds true as to the commercial availability of the diamine monomers as indicated for the other monomer components of the adhesive compositions of this invention. Those diamines not readily available as stock reagents can be prepared by standard synthesis techniques.

2. Adhesive Preparation — The polycarbonamide-ester adhesive compositions of this invention can be prepared by standard melt polymerization techniques from monomer mixtures comprising a stoichiometric amount of a saturated aliphatic dicarboxylic acid having a hydrocarbon chain length of 4 to 12 carbon atoms and a stoichiometric amount of a saturated alkanolamine having a hydrocarbon chain length of 2 to 6 carbon atoms. The preferred polycarbonamide-ester adhesive compositions of this invention are those having a more favorable combination of viscosity and tensile shear strength, and can be prepared by standard melt polymerization techniques from stoichiometric amounts to 7.0 mole percent excess of a saturated aliphatic dicarboxylic acid having a hydrocarbon chain length of 4 to 12 carbon atoms with a stoichiometric amount of a mixture comprising 70.0 to 99.0 mole percent based on dicarboxylic acid, of a saturated aliphatic alkanolamine having a hydrocarbon chain length of 2 to 6 carbon atoms, and 1.0 to 30.0 mole percent based on dicarboxylic acid, of a saturated aliphatic diamine having a hydrocarbon chain length of 6 carbon atoms, or a symmetrical alicyclic diamine having a hydrocarbon ring of 8 carbon atoms.

For a comprehensive description of the apparatus and techniques generally employed in the melt polymerization process, reference can be made to any of the standard texts on polymer preparation e.g. Sorenson and Campbell, "Preparative Methods of Polymer Chemistry", Interscience Publishers, Inc., New York (1961).

The adhesive compositions of this invention can be prepared by charging a reaction vessel equipped with a thermometer, a nitrogen gas inlet and a distilling condenser with the monomers of either of the two systems disclosed above. The reaction vessel is first purged with nitrogen, the monomers melted, and then heated at refluxing temperatures for a period of at least 15 minutes, but usually not more than 3 hours. Ordinarily, the reaction temperatures will vary with changes in pressure on the system; refluxing of the monomers at reduced pressures taking place at lower temperatures and the reverse occurring at higher pressures. Preferably, the reaction temperature of the system should be maintained at about 200°C. at one atmosphere to control the degree of polymerization which in turn limits the molecular weight of the copolymers. After the condensation of monomer has proceeded substantially to completion, the reaction vessel is turned to distillation and the temperature gradually increased over a period of 3 hours to about 235°C. Simultaneous with this change-over to distillation, the pressure on the charge is also reduced to about 5 to 10mm of Hg. The polymer is collected and either used directly while still fluid or allowed to cool and harden. The polymer thus produced is transparent while fluid; however, it becomes milky and opaque when bulk set. If the copolymer is uniformly smeared in a thin film between two laminae, e.g. a glass slide and a polyethylene tab, the copolymer adhesive also becomes increasingly opaque upon setting and aging, indicative of the gradual growth of crystals within the copolymer.

METHOD FOR BONDING IMPERVIOUS LAMINAE

Impervious Laminae

The laminae which are to be bonded by thermoplastic adhesives according to the methods of this invention are component parts or layers of an adhesively bonded sandwich or any element which is to be bonded to a separate element in the manufacture of an article of composite construction. Such laminae are composed of impervious materials which are generally recognized to be relatively impenetrable by, or nonabsorbent, of fluid media, such as the thermoplastic adhesives of this invention. Impervious materials which can be bonded to themselves or dissimilar materials by thermoplastic adhesives of this invention are glass, polyethylene, polyvinyl chloride, and various metals such as iron, aluminum, copper and their alloys. An alloy of one of the above metals comprises in excess of 50 weight percent of one of the specifically enumerated metals together with minor amounts of one or more additional metal forming components. A typical alloy of one of the enumerated metals which can be bonded by my thermoplastic adhesives according to the method of this invention is stainless steel.

The preferred laminae of this invention are glass and low to high density polyethylene.

The glass composition of the glass laminae of this invention does not appear to be of critical importance, and any of the glass compositions currently in use in the manufacture of such articles as light bulbs, beverage containers, television tube envelopes and auto glass should prove amenable to bonding with the adhesive of this invention. Similarly, the polyethylene composition of the polyethylene laminae of this invention doesn't appear critical; provided that, such composition does not contain additives, such as antioxidants, flame retardants, etc., in amounts which prove functionally significant with respect to the adherence of the adhesive to the polyethylene laminae.

The laminae of the articles of composite construction of this invention can take any form and therefore can be bonded to one another in a variety of ways depending, of course, upon the intended structure of the ultimate assemblage.

Laminae typical of those which can be bonded by the adhesives of this invention are the component parts of the structures disclosed in U.S. Pat. No. 3,482,724 (to R. A. Heaton). The glass envelopes disclosed therein are thin wall structures terminating in an open mouth at one end, an intermediate concavely curved neck region 8 and a lower or major portion 9 of the envelope which is constructed with an outline approximating that of a major section sphere 9a. This lower or major portion of the envelope is of a substantially circular configuration in horizontal section at every elevational of such portion and substantially continuously convexly arcuate in all axial sections, (vertical planes passing through the central vertical axis of the envelope), of the envelope. The second element of Heaton's container, a cup-like fitment 3, can be designed for engaging the lower or major portion of the glass envelope at an interface coincident with the exterior lateral wall of the envelope and the interior of the upstanding cylindrical wall of the fitment. The cup-like fitment can also engage the envelope at the nadir of arc of the spherical wall of the envelope which itself can be specially adapted for such engagement by slightly flattening the arc of the container at that point. The above mentioned patent of Heaton is hereby incorporated by way of reference into the disclosure of this application.

METHOD OF BONDING

Articles of manufacture can be prepared from two or more laminae of relatively impervious materials utilizing the thermoplastic adhesive compositions of this invention by bonding these laminae along their common points of engagement to one another with such adhesives. The manner of application of the adhesive, the amount of adhesive required to effectively join such laminae and the strength of the bond thus produced will vary from composite to composite depending upon the physical nature of the materials to be bonded and the stresses to be endured at the point of engagement by the components of the proposed composite.

The thermoplastic adhesives of this invention can ordinarily be applied to either one or both components of the composite to be assembled. The technique for applying such materials can vary, from the rather slow conventional manual methods of applying such adhesives, to the high speed, automated dispensing systems commonly employed in the packaging and product assembly industries. The amount of adhesive applied to the components is also variable depending upon the physical surface characteristics of the respective laminae and the mechanical configuration of the adhesive junction. For example, the amount of adhesive required to join smooth surfaces will be considerably greater than the amount required to effectively bond an abraded surface. Similarly, the amount of adhesive required to effectively withstand the stresses encountered by a butt joint will substantially exceed that necessary to effectively bond a dove tail-type junction. This point of adhesive application can be generally described as an adhesive interface which is defined in terms of that area on each component part (or lamina) which is in contact with or separated from a coincident or abutting adhesive interface of a juxtaposed lamina by a deposit or thin layer of adhesive. Areas falling within this definition include also surfaces which are designated as the situs for the deposition of adhesive or designated to be contacted by a surface of a lamina having such adhesive deposits.

Once the melt of the adhesive has been applied to one or more of the component parts of a composite article, the respective elements of such article can be aligned and seated, while the adhesive is still fluid. Alternatively, the adhesive can be allowed to set for a sufficient interval after the application until it forms a self-supporting film. Setting can be expedited by subjecting the adhesive to a chilling blast of cool air or carbon dioxide. Once having set, the adhesive can be remelted, either by exposing it to temperatures in excess of its visco-elastic temperature range or by contacting the adhesive with a surface of a second lamina that is heated sufficiently to cause the adhesive to flow.

After the adhesive interfaces of the component parts (or laminae) of the proposed article to be assembled are coated with adhesive where necessary, the parts can be aligned and seated along their intended points of engagement. Once so assembled, the original registration of the component parts as seated must be maintained at least until such time as the adhesive has sufficiently cured or aged to withstand the initial stresses which may be placed upon the adhesive bond by the weight of the respective elements of the composites themselves. Good initial bond strength can be accelerated in the same manner utilized in the expediting of the setting of adhesive discussed previously. However, the curing or aging of the adhesive, more specifically, the gradual increase in the degree of crystallinity of the thermoplastic adhesive composition of this invention is developed only with passing time. In many instances, once the composite has been assembled, as in the case of the composite container depicted in FIG. 1, the intimate or interlocking union of the components or the force of gravity, as in the case of the laminate depicted in FIG. 2, are often sufficient in and of themselves to retain the original alignment of the component parts.

The interval required to cure or age the adhesive, and thus develop the requisite creep resistance necessary in the adhesive to resist elongation under stress, usually takes at least one to 24 hours, depending upon the particularl adhesive composition.

Preparation of composite articles of manufacture utilizing the adhesive compositions of this invention can also involve the assembly of more than two component parts at a single time by merely distributing the adhesive along the several adhesive interfaces of the parts to be assembled, followed by aligning and seating the component parts as desired. This method of assembly can be used in the preparation of multiple layered laminates or in other related applications.

It is also possible to prepare a multiple layer laminate by merely recycling the composite of a previous cycle with additional laminae.

The following examples further illustrate the adhesive compositions, methods and composite articles of manufacture of this invention. Parts and percentages wherein appearing in such examples are by weight unless otherwise stipulated.

EXAMPLE I

A three neck 250 ml flask, fitted with a thermometer, $N_2$ gas inlet and a distilling condenser, is charged with 75.2 gm (0.4 moles) azelaic acid and 24.4 gms (0.4 moles) of ethanolamine. The mixture is refluxed for 2 hours under a nitrogen blanket at a pot temperature of 140°C. and a refluxing temperature of 98°C. The system is now turned to distillation, gradually increasing the pot temperature of the system to 200°C. over a period of 1 hour. At the end of the third hour, the pressure on the system is reduced to about 10mm Hg and pot temperature again gradually increased over the next 3 hours to 230°C. The polymer is collected in an aluminum pan, cooled to 160°C. and its viscosity recorded at 2860 cps.

After the copolymer product has cooled to about 160°C. it is manually applied in a uniform continuous annular band to the interior upstanding cylindrical wall of a cup-like fitment. The copolymer is then set with a chilling blast of carbon dioxide. Once the copolymer has set, the open end of the cup-like fitment is brought into alignment with the convexly arcuate portion of the major segment of a glass envelope which is still sufficiently residually heated from its forming operation to cause the adhesive to flow upon contact. Once the two elements are aligned, preferably with the vertical axis of the envelope at right angles to the horizontal base of the fitment, they are seated. The container thus produced is stored in an inverted position overnight in order to insure sufficient curing of the adhesive so that registration is maintained between the two elements. This container demonstrates good resistance to vertical creep when subject to loads equal to and in excess of that anticipated to be encountered in use.

EXAMPLE II

Following the procedure of Example I, a copolymer having a viscosity of 1750 cps at 160°C. is prepared from equimolar amounts of azelaic acid and 3-amino-1-propanol. The copolymer formed is capable of forming creep resistant adhesive bonds between glass and low to medium density polyethylene, as well as a variety of other impervious laminae.

EXAMPLE III

Following the procedure of Example I a copolymer having a vicosity of 1900 cps at 160°C. is prepared from equimolar amounts of sebacic acid and 3-amino-1-propanol. The copolymer formed is capable of forming creeping resistant adhesive bonds between glass and low to medium density polyethylene, as well as a variety of other impervious laminae.

EXAMPLE IV

Following the procedure of Example I, a copolymer having a viscosity of 4490 cps at 160°C. is prepared from equimolar amounts of adipic acid and 3-amino-1-propanol. The copolymer formed is capable of forming creep resistant adhesive bonds between glass and low to medium density polyethylene, as well as a variety of other impervious laminae.

EXAMPLE V

Following the procedures of Example I, a copolymer having a viscosity of 2320 cps at 160°C. is prepared from 1.06 moles adipic acid and 1.00 moles of a mixture comprising 85.0 mole percent ethanolamine and 15.0 mole percent 1,6 hexamethylenediamine. The copolymer formed is capable of forming creep resistant adhesive bonds between glass and low to medium density polyethylene, as well as a variety of other impervious laminae.

EXAMPLE VI

Following the procedures of Example I, a copolymer having a viscosity of 2040 cps at 160°C. is prepared from 1.06 moles azelaic acid and 1.00 moles of a mixture comprising 85.0 mole percent ethanolamine and 15.0 mole percent ethylenediamine. The copolymer formed is capable of forming creep resistant adhesive bonds between glass and low to medium density polyethylene, as well as a variety of other impervious laminae.

EXAMPLE VII

Following the procedures of Example I, a copolymer having a viscosity of 2470 cps at 160°C. is prepared from stoichiometric amounts of 1.06 moles azelaic acid and 1.00 moles of a mixture comprising 85.0 mole percent 3-amino-1 propanol and 15.0 mole percent ethylenediamine. The copolymer formed is capable of forming creep resistant adhesive bonds between glass and low to medium density polyethylene, as well as a variety of other impervious laminae.

What I claim is:

1. In a laminated article comprising two juxtaposed lamina of relatively impervious materials, wherein one of said lamina is polyethylene, and hot melt adhesive means disposed intermediate said lamina for bonding said lamina to each other, the improvement wherein said adhesive means is a crystalline, creep-resistant composition having a tensile shear strength of about 75 to 140 pounds per 1 inch by ½ inch lap, said composition being the polymeric product of the condensation of a monomer mixture consisting essentially of a. a compound of the formula

wherein R is a saturated aliphatic hydrocarbon radical of 4 to 10 carbon atoms and b. a compound of the formula $NH_2-R'-OH$ wherein R' is a saturated aliphatic hydrocarbon radical of 2 to 6 carbon atoms or a mixture of 70 to 99 mole percent of a compound of the formula $NH_2-R'-OH$ wherein R' is a saturated aliphatic hydrocarbon radical of 2 to 6 carbon atoms with 1 to 30 mole percent of a compound of the formula $NH_2-R''-NH_2$ wherein R'' is a saturated aliphatic hydrocarbon radical of 2 to 6 carbon atoms or a symmetrical alicyclic hydrocarbon radical of 8 carbon atoms, and having a molecular weight of about 2000 to 7000, the compound of (a) being a stoichiometric amount to 7.0 mole percent excess.

2. The laminated article of claim 1 wherein the other of said two juxtaposed lamina is glass.

* * * * *